US008665235B2

(12) United States Patent
Tang et al.

(10) Patent No.: US 8,665,235 B2
(45) Date of Patent: Mar. 4, 2014

(54) TOUCH STRUCTURE AND TOUCH PANEL HAVING AN ANTENNA FUNCTION

(75) Inventors: Chia-Lun Tang, Miaoli County (TW); Yu-Pin Chang, Taoyuan County (TW)

(73) Assignee: Auden Techno Corp., Taoyuan County (TW)

( * ) Notice: Subject to any disclaimer, the term of this patent is extended or adjusted under 35 U.S.C. 154(b) by 230 days.

(21) Appl. No.: 13/118,354

(22) Filed: May 27, 2011

(65) Prior Publication Data

US 2012/0299841 A1    Nov. 29, 2012

(51) Int. Cl.
*G06F 3/048* (2013.01)
(52) U.S. Cl.
USPC ........................................ 345/173; 455/575.7
(58) Field of Classification Search
None
See application file for complete search history.

(56) References Cited

U.S. PATENT DOCUMENTS 8,270,914 B2 *    9/2012  Pascolini et al. ............. 455/90.2
2007/0287503 A1 * 12/2007  Ying et al. .................... 455/566

\* cited by examiner

*Primary Examiner* — Joseph Haley
(74) *Attorney, Agent, or Firm* — Li & Cai Intellectual Property (USSA) Office

(57) ABSTRACT

A touch structure having an antenna function includes a substrate unit and an antenna unit. The substrate unit has a touch surface on the top surface thereof for an external object to touch in order to operate a touch-controlled module. The substrate unit includes at least one transparent substrate having at least one transparent portion and at least one nontransparent portion disposed around the transparent portion and combined with the transparent portion, the transparent portion has an image-viewing area on the top surface thereof, and the nontransparent portion has a non-image-viewing area on the top surface thereof. The antenna unit includes at least one antenna radiation structure disposed on the transparent substrate or embedded in the transparent substrate, and the layout of the antenna radiation structure shows an antenna radiation pattern having a predetermined operation band.

4 Claims, 4 Drawing Sheets

TOUCH STRUCTURE AND TOUCH PANEL HAVING AN ANTENNA FUNCTION

BACKGROUND OF THE INVENTION

1. Field of the Invention

The instant disclosure relates to a touch structure and a touch panel, and more particularly, to a touch structure and a touch panel having an antenna function.

2. Description of Related Art

Generally speaking, touch panels may be operated by means of infrared, ultrasonic, piezoelectric, capacitive or resistive sensing. The capacitive touch panel has inner wires made of transparent conductive materials on a glass substrate, and transmitting signals to integrated circuits (IC) configured on an outer flexible PCB or rigid PCB via peripheral conductive wires on the glass substrate. Such structure constitutes a touch sensor, which configured to an outer printed circuit board and a top protecting cover to complete a touch panel. A uniform electric field is generated on surface of the glass substrate when touching. Coordinates of the contact point are determined by variation of capacitance due to electrostatic reaction generated between the user's finger and the electric field when a user touches the touch panel.

SUMMARY OF THE INVENTION

One particular aspect of the instant disclosure is to provide a touch structure and a touch panel having an antenna function, and the touch structure and the touch panel can be applied to any electronic device having a touch-controlled function for transmitting or receiving wireless signals.

In order to achieve the above-mentioned advantages, the instant disclosure provides a touch panel having an antenna function. The touch panel comprises a touch-controlled unit, a substrate unit, and an antenna unit, and the substrate unit and the antenna unit can be combined with each other to form a touch structure having an antenna function. The touch-controlled unit includes at least one a touch-controlled module. The substrate unit has a touch surface on the top surface thereof for an external object to touch in order to indirectly operate the touch-controlled module. In addition, the substrate unit includes at least one transparent substrate having at least one transparent portion and at least one nontransparent portion disposed around the transparent portion and combined with the transparent portion. The transparent portion has an image-viewing area on the top surface thereof, and the nontransparent portion has a non-image-viewing area on the top surface thereof. The antenna unit includes at least one antenna radiation structure disposed on the transparent substrate or embedded in the transparent substrate, and the layout of the antenna radiation structure shows an antenna radiation pattern having a predetermined operation band.

Therefore, the antenna radiation structure can be disposed on the transparent substrate or embedded in the transparent substrate, thus both the touch structure and the touch panel of the instant disclosure can be applied to any electronic device having a touch-controlled function for transmitting or receiving wireless signals.

To further understand the techniques, means and effects the instant disclosure takes for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention that they be used for limiting the instant disclosure.

DETAILED DESCRIPTION OF THE PREFERRED EMBODIMENTS

First Embodiment

Figure 1A:
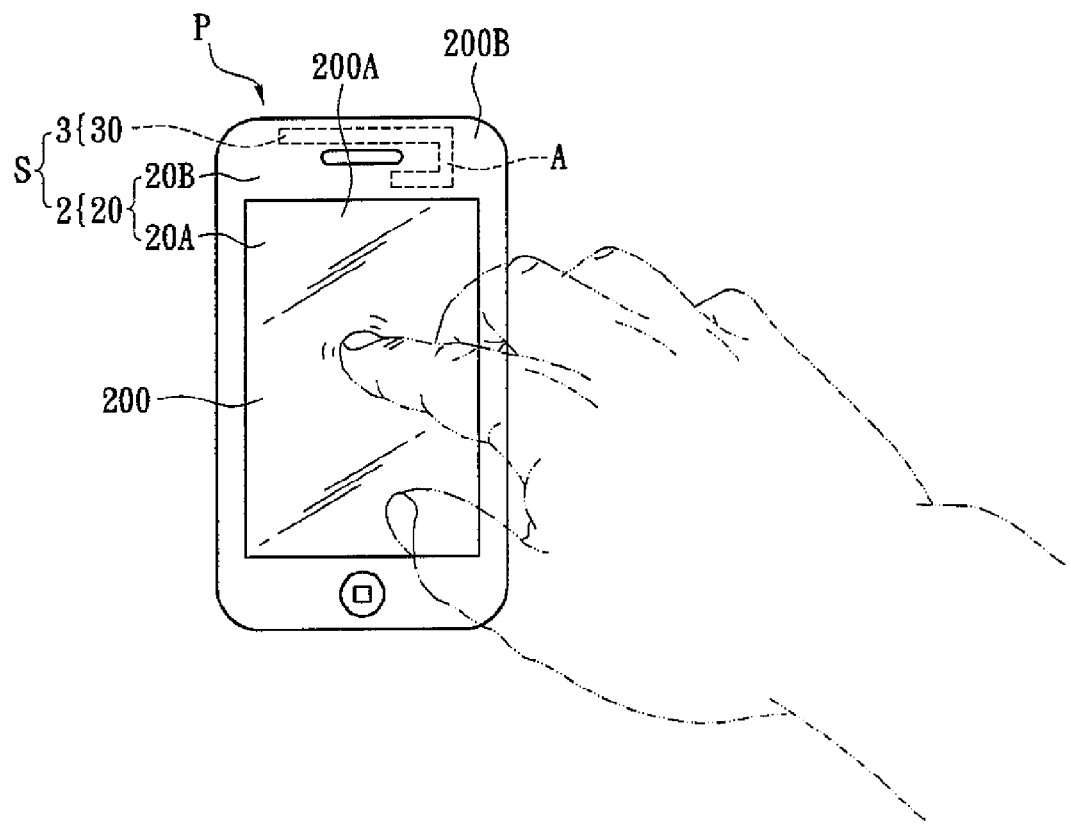
FIG. 1A shows a top, schematic view of the touch panel applied to the mobile phone according to the first embodiment of the instant disclosure.

Referring to FIGS. 1A to 1D, the first embodiment of the instant disclosure provides a touch panel Z having an antenna function, and the touch panel Z can be applied to any electronic device (such as a mobile phone P as shown in FIG. 1A) having a touch-controlled function. The touch panel Z comprises a touch-controlled unit 1, a substrate unit 2, and an antenna unit 3, and the substrate unit 2 and the antenna unit 3 can be combined with each other to form a touch structure S having an antenna function.

The touch-controlled unit 1 includes at least one a touch-controlled module 10.

The substrate unit 2 has a touch surface 200 on the top surface thereof for an external object (such as a user's finger in FIG. 1A or any type of touch pen) to touch in order to indirectly operate the touch-controlled module 10. In addition, the substrate unit 2 includes at least one transparent substrate 20 having at least one transparent portion 20A and at least one nontransparent portion 20B disposed around the transparent portion 20A and (integrally or non-integrally) combined with the transparent portion 20A. The transparent portion 20A has an image-viewing area 200A on the top surface thereof, and the nontransparent portion 20B has a non-image-viewing area 200B on the top surface thereof. In other words, the user can touch the touch surface 200 (such as the image-viewing area 200A of the transparent portion 20A) to operate the touch-controlled module 10 by the finger or the touch pen.

The antenna unit 3 includes at least one antenna radiation structure 30 disposed on the transparent substrate 20, and the layout of the antenna radiation structure 30 shows an antenna radiation pattern A having a predetermined operation band. For example, the antenna radiation structure 30 may be a light-permitting antenna or an opaque antenna according to different requirements. In addition, wherein the antenna radiation structure 30 can be disposed on the non-image-viewing area 200B of the nontransparent portion 20B, the transparent unit 2 includes a transparent protection layer 21 covering the antenna radiation structure 30, and the top surface of the transparent protection layer 21 is the touch surface 200. Moreover, the antenna unit 3 includes at least one conductive track 31 simultaneously formed on the top surface 201, the lateral surface 202, and the bottom surface 203 of the transparent substrate 20, and the antenna radiation structure 30 can be electrically connected to a wireless module W under the transparent substrate 20 through the conductive track 31.

Figure 1B:
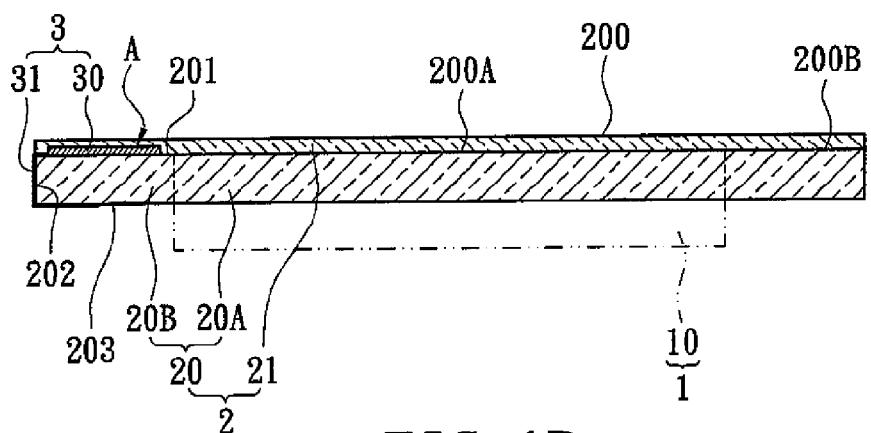
FIG. 1B shows a lateral, cross-sectional, schematic view of the touch panel according to the first embodiment of the instant disclosure.
Figure 1C:
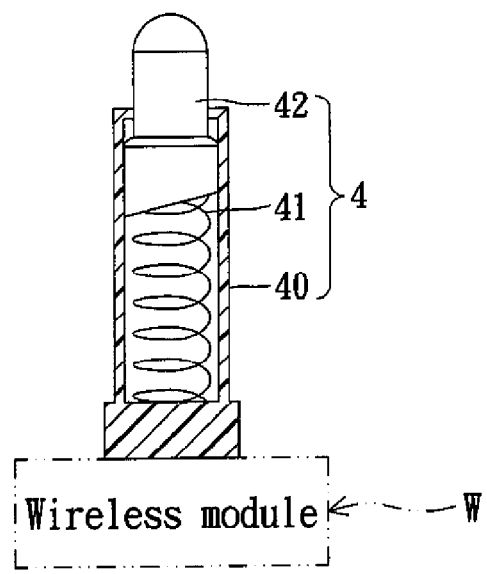
FIG. 1C shows a partial, cross-sectional, schematic view of the conductive unit having not been pressed yet according to the first embodiment of the instant disclosure.
Figure 1D:
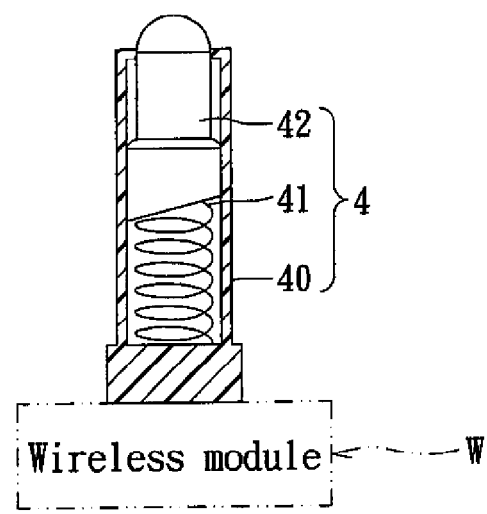
FIG. 1D shows a partial, cross-sectional, schematic view of the conductive unit having been pressed according to the first embodiment of the instant disclosure.

Referring to FIGS. 1C and 1D, the first embodiment of the instant disclosure further comprises a conductive structure 40 electrically connected between the conductive track 31 and the wireless module W. The conductive structure 40 includes a conductive casing 40, an elastic element 41 received in the conductive casing 40, and a movable element 42 connected to one end of the elastic element 41. For example, the movable element 42 can be positioned at a first position before pressing the movable element 42 (as shown in FIG. 1C) and the movable element 42 can be positioned at a second position after pressing the movable element 42 (as shown in FIG. 1D). Hence, the instant disclosure can use the conductive structure 4 to elastically and electrically connect between the conductive track 31 and the wireless module W, thus wireless signals can be transmitted or received by matching the antenna radiation structure 30 and the wireless module W.

Second Embodiment

Figure 2:
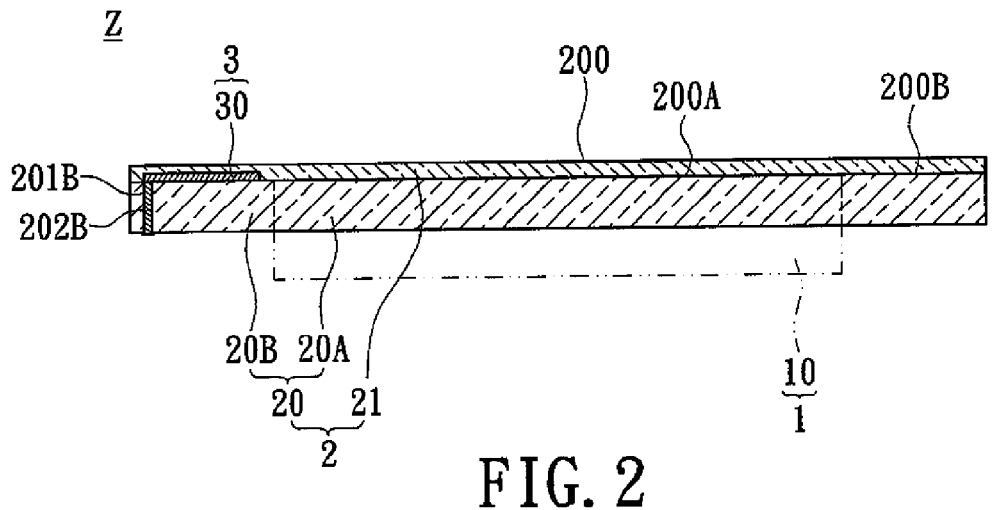
FIG. 2 shows a lateral, cross-sectional, schematic view of the touch panel according to the second embodiment of the instant disclosure.

Referring to FIG. 2, the second embodiment of the instant disclosure provides a touch panel Z having an antenna function. Comparing FIG. 2 with FIG. 1B, the difference between the second embodiment and the first embodiment is that: in the second embodiment, the nontransparent portion 20B includes a conductive body 202B and a through hole 201B filled up with the conductive body 202B, and the antenna radiation structure 30 can be electrically connected to a wireless module W under the transparent substrate 20 through the conductive body 202B. For example, the second embodiment can use the conductive structure 4 of the first embodiment (as shown in FIGS. 1C and 1D) to elastically and electrically connect between the bottom side of the conductive body 202B and the wireless module W, thus wireless signals can be transmitted or received by matching the antenna radiation structure 30 and the wireless module W.

Third Embodiment

Figure 3:
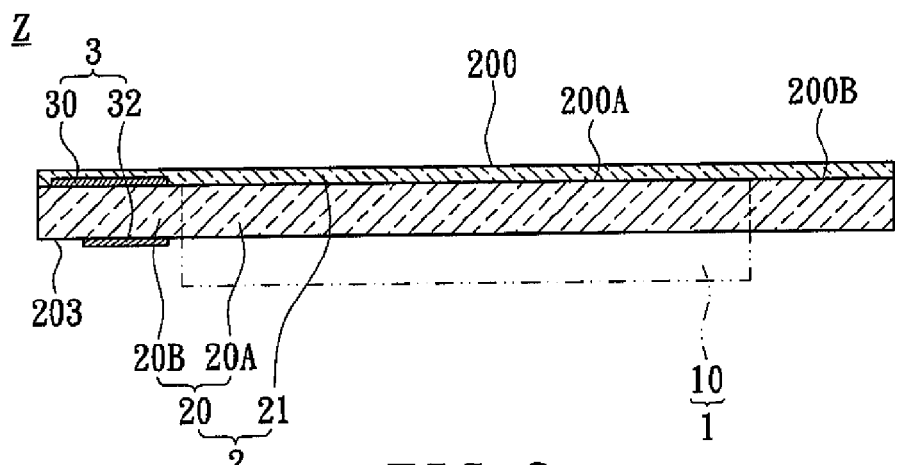
FIG. 3 shows a lateral, cross-sectional, schematic view of the touch panel according to the third embodiment of the instant disclosure.

Referring to FIG. 3, the third embodiment of the instant disclosure provides a touch panel Z having an antenna function. Comparing FIG. 3 with FIG. 1B, the difference between the third embodiment and the first embodiment is that: in the third embodiment, the antenna unit 3 includes an antenna coupling structure 32 formed on the bottom surface 203 of the nontransparent portion 20B, the antenna radiation structure 30 and the antenna coupling structure 32 can be electrically coupled with each other, and the antenna coupling structure 32 can be electrically connected to a wireless module W under the transparent substrate 20. For example, the third embodiment can use the conductive structure 4 of the first embodiment (as shown in FIGS. 1C and 1D) to elastically and electrically connect between the antenna coupling structure 32 and the wireless module W, thus wireless signals can be transmitted or received by matching the antenna radiation structure 30 and the wireless module W.

Fourth Embodiment

Figure 4:
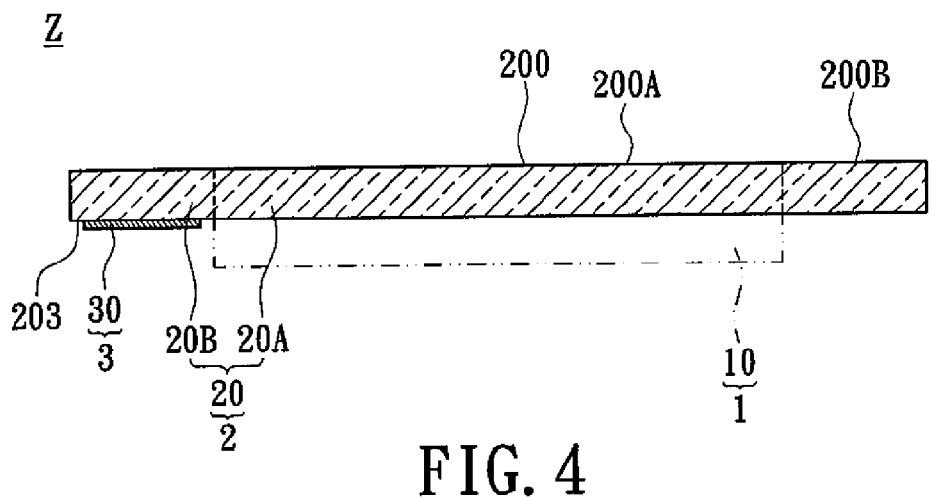
FIG. 4 shows a lateral, cross-sectional, schematic view of the touch panel according to the fourth embodiment of the instant disclosure.

Referring to FIG. 4, the fourth embodiment of the instant disclosure provides a touch panel Z having an antenna function. Comparing FIG. 4 with FIG. 1B, the difference between the fourth embodiment and the first embodiment is that: in the fourth embodiment, the antenna radiation structure 30 can be disposed on the bottom surface 203 of the nontransparent portion 20B, the antenna radiation structure 30 can be electrically connected to a wireless module W under the transparent substrate 20, and the top surface of the antenna radiation structure 30 is the touch surface 200. For example, the fourth embodiment can use the conductive structure 4 of the first embodiment (as shown in FIGS. 1C and 1D) to elastically and electrically connect between the antenna radiation structure 30 and the wireless module W, thus wireless signals can be transmitted or received by matching the antenna radiation structure 30 and the wireless module W. In addition, the fourth embodiment can provide the transparent protection layer 21 (as shown in FIG. 1B) formed on the top surface of the transparent substrate 20 or omit the transparent protection layer 21.

Fifth Embodiment

Figure 5:
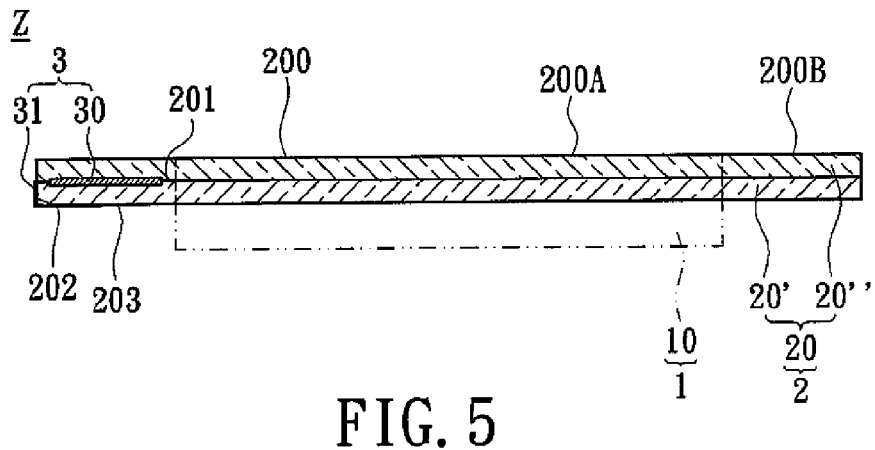
FIG. 5 shows a lateral, cross-sectional, schematic view of the touch panel according to the fifth embodiment of the instant disclosure.

Referring to FIG. 5, the fifth embodiment of the instant disclosure provides a touch panel Z having an antenna function. Comparing FIG. 5 with FIG. 1B, the difference between the fifth embodiment and the first embodiment is that: in the fifth embodiment, the antenna unit 3 includes at least one antenna radiation structure 30 embedded in the transparent substrate 20. In other words, the transparent substrate 20 includes a first transparent body 20' and a second transparent body 20" disposed on the first transparent body 20', and the antenna radiation structure 30 is disposed between the first transparent body 20' and the second transparent body 20". In addition, the antenna unit 3 includes at least one conductive track 31 simultaneously formed on the top surface 201, the lateral surface 202, and the bottom surface 203 of the first transparent body 20', and the antenna radiation structure 30 can be electrically connected to a wireless module W under the first transparent body 20' through the conductive track 31. For example, the fifth embodiment can use the conductive structure 4 of the first embodiment (as shown in FIGS. 1C and 1D) to elastically and electrically connect between the conductive track 31 and the wireless module W, thus wireless signals can be transmitted or received by matching the antenna radiation structure 30 and the wireless module W. In addition, the fifth embodiment can provide the transparent protection layer 21 (as shown in FIG. 1B) formed on the top surface of the transparent substrate 20 or omit the transparent protection layer 21.

Sixth Embodiment

Figure 6:
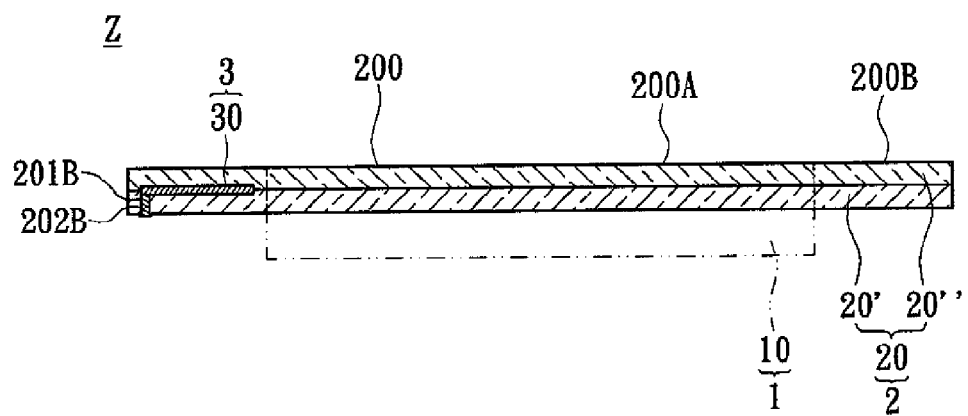
FIG. 6 shows a lateral, cross-sectional, schematic view of the touch panel according to the sixth embodiment of the instant disclosure.

Referring to FIG. 6, the sixth embodiment of the instant disclosure provides a touch panel Z having an antenna function. Comparing FIG. 6 with FIG. 5, the difference between the sixth embodiment and the fifth embodiment is that: in the sixth embodiment, the first transparent body 20' includes a conductive body 202B and a through hole 201B filled up with the conductive body 202B, and the antenna radiation structure 30 can be electrically connected to a wireless module W under the first transparent body 20' through the conductive body 202B. For example, the sixth embodiment can use the conductive structure 4 of the first embodiment (as shown in FIGS. 1C and 1D) to elastically and electrically connect between the bottom side of the conductive body 202B and the wireless module W, thus wireless signals can be transmitted or received by matching the antenna radiation structure 30 and the wireless module W.

Seventh Embodiment

Figure 7:
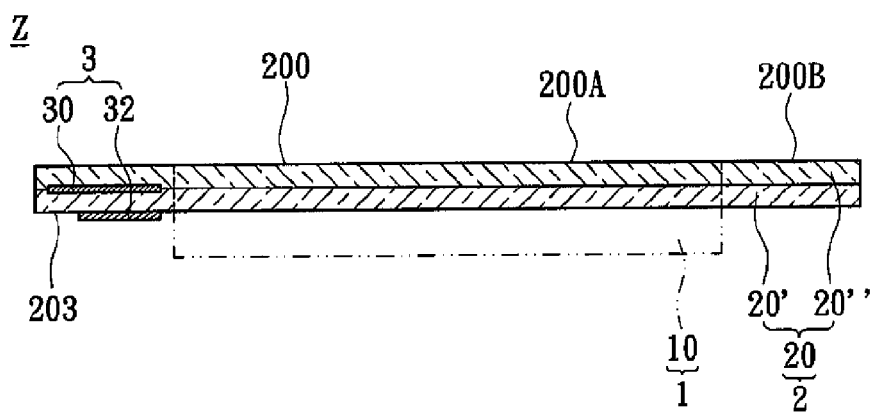
FIG. 7 shows a lateral, cross-sectional, schematic view of the touch panel according to the seventh embodiment of the instant disclosure.

Referring to FIG. 7, the seventh embodiment of the instant disclosure provides a touch panel Z having an antenna function. Comparing FIG. 7 with FIG. 5, the difference between the seventh embodiment and the fifth embodiment is that: in the seventh embodiment, the antenna unit 3 includes an antenna coupling structure 32 formed on the bottom surface 203 of the first transparent body 20', the antenna radiation structure 30 and the antenna coupling structure 32 can be electrically coupled with each other, and the antenna coupling structure 32 can be electrically connected to a wireless module W under the first transparent body 20'. For example, the seventh embodiment can use the conductive structure 4 of the first embodiment (as shown in FIGS. 1C and 1D) to elastically and electrically connect between the antenna coupling structure 32 and the wireless module W, thus wireless signals can be transmitted or received by matching the antenna radiation structure 30 and the wireless module W.

In conclusion, the antenna radiation structure can be disposed on the transparent substrate or embedded in the transparent substrate, thus both the touch structure and the touch panel of the instant disclosure can be applied to any electronic device having a touch-controlled function for transmitting or receiving wireless signals.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. A touch structure, comprising:
a substrate unit having a touch surface on the top surface thereof for an external object to touch in order to operate a touch-controlled module, wherein the substrate unit includes at least one transparent substrate having at least one transparent portion and at least one nontransparent portion disposed around the transparent portion and combined with the transparent portion, the transparent portion has an image-viewing area on the top surface thereof, and the nontransparent portion has a non-image-viewing area on the top surface thereof;
an antenna unit including at least one antenna radiation structure disposed on the transparent substrate or embedded in the transparent substrate, wherein the layout of the antenna radiation structure shows an antenna radiation pattern having a predetermined operation band; and
wherein the antenna radiation structure is disposed on the non-image-viewing area of the nontransparent portion, the substrate unit includes a transparent protection layer covering the antenna radiation structure, and the top surface of the transparent protection layer is the touch surface.

2. The touch structure as claimed in claim 1, wherein the antenna unit includes at least one conductive track simultaneously formed on the top surface, the lateral surface, and the bottom surface of the transparent substrate, and the antenna radiation structure is electrically connected to a wireless module under the transparent substrate through the conductive track.

3. A touch panel, comprising:
a touch-controlled unit including at least one a touch-controlled module;
a substrate unit having a touch surface on the top surface thereof for an external object to touch in order to operate the touch-controlled module, wherein the substrate unit includes at least one transparent substrate having at least one transparent portion and at least one nontransparent portion disposed around the transparent portion and combined with the transparent portion, the transparent portion has an image-viewing area on the top surface thereof, and the nontransparent portion has a non-image-viewing area on the top surface thereof;
an antenna unit including at least one antenna radiation structure disposed on the transparent substrate or embedded in the transparent substrate, wherein the layout of the antenna radiation structure shows an antenna radiation pattern having a predetermined operation band; and
wherein the antenna radiation structure is disposed on the non-image-viewing area of the nontransparent portion, the substrate unit includes a transparent protection layer covering the antenna radiation structure, and the top surface of the transparent protection layer is the touch surface.

4. The touch panel as claimed in claim 3, wherein the antenna unit includes at least one conductive track simultaneously formed on the top surface, the lateral surface, and the bottom surface of the transparent substrate, and the antenna radiation structure is electrically connected to a wireless module under the transparent substrate through the conductive track.

* * * * *